United States Patent [19]

Jones

[11] Patent Number: 5,337,160
[45] Date of Patent: Aug. 9, 1994

[54] ERROR DIFFUSION PROCESSOR AND METHOD FOR CONVERTING A GREY SCALE PIXEL IMAGE TO A BINARY VALUE PIXEL IMAGE

[75] Inventor: Arlin R. Jones, Boise, Id.

[73] Assignee: Hewlett-Packard, Palo Alto, Calif.

[21] Appl. No.: 907,006

[22] Filed: Jul. 1, 1992

[51] Int. Cl.$^5$ ............................................. H04N 1/40
[52] U.S. Cl. .................................. 358/447; 358/465; 358/456; 345/132; 345/138
[58] Field of Search ............... 358/447, 456, 461, 462, 358/463, 443, 465, 466, 455, 433, 458, 459; 345/132, 138, 143, 149, 137; 395/128, 151, 143

[56] References Cited

U.S. PATENT DOCUMENTS

| | | | |
|---|---|---|---|
| 4,523,231 | 6/1985 | Therrien | 358/139 |
| 4,625,202 | 11/1986 | Richmond et al. | 340/709 |
| 4,648,045 | 3/1987 | Demetrescu | 340/799 X |
| 4,680,645 | 7/1987 | Dispoto et al. | 358/298 |
| 4,780,711 | 10/1988 | Doumas | 340/728 X |
| 4,851,825 | 7/1989 | Naiman | 340/728 X |
| 4,891,714 | 1/1990 | Klees | 358/456 |
| 5,086,484 | 2/1992 | Katayama et al. | 358/465 |
| 5,130,823 | 7/1992 | Bowers | 358/465 |
| 5,172,247 | 12/1992 | Ghaderi | 358/456 |

FOREIGN PATENT DOCUMENTS

| | | |
|---|---|---|
| 0174721 | 3/1986 | European Pat. Off. |
| 0201674 | 11/1986 | European Pat. Off. |
| 0333520 | 9/1989 | European Pat. Off. |
| 0395404 | 10/1990 | European Pat. Off. |

OTHER PUBLICATIONS

"4.3: An Adaptive Algorithm for Spatial Grey Scale", Robert Floys & Louis Steinberg, 2 pages.

"On The Error Diffusion Technique For Electronic Halftoning", C. Billotet-Hoffmann & O. Bryngdahl, Proceedings of the SID, vol. 24/3, 1983.

*Primary Examiner*—Paul Ip

[57] ABSTRACT

A data processing system converts a raster image of grey scale value pixels into an image of binary value pixels and diffuses pixel value errors that result from the conversion. The data processing system initially converts a grey scale value pixel to a binary value pixel, determines an error value for the pixel by finding a difference between the pixel's binary value and its previous grey scale value; derives error diffusion values attributable to immediately adjacent pixels in a next line of the raster image and stores those attributable error diffusion values. Upon reaching one of the immediately adjacent grey scale value pixels in the next line, and during a conversion of that pixel from its grey scale value to a binary value, the attributable stored error diffusion values are accessed and combined with the adjacent pixel's grey scale value.

6 Claims, 4 Drawing Sheets

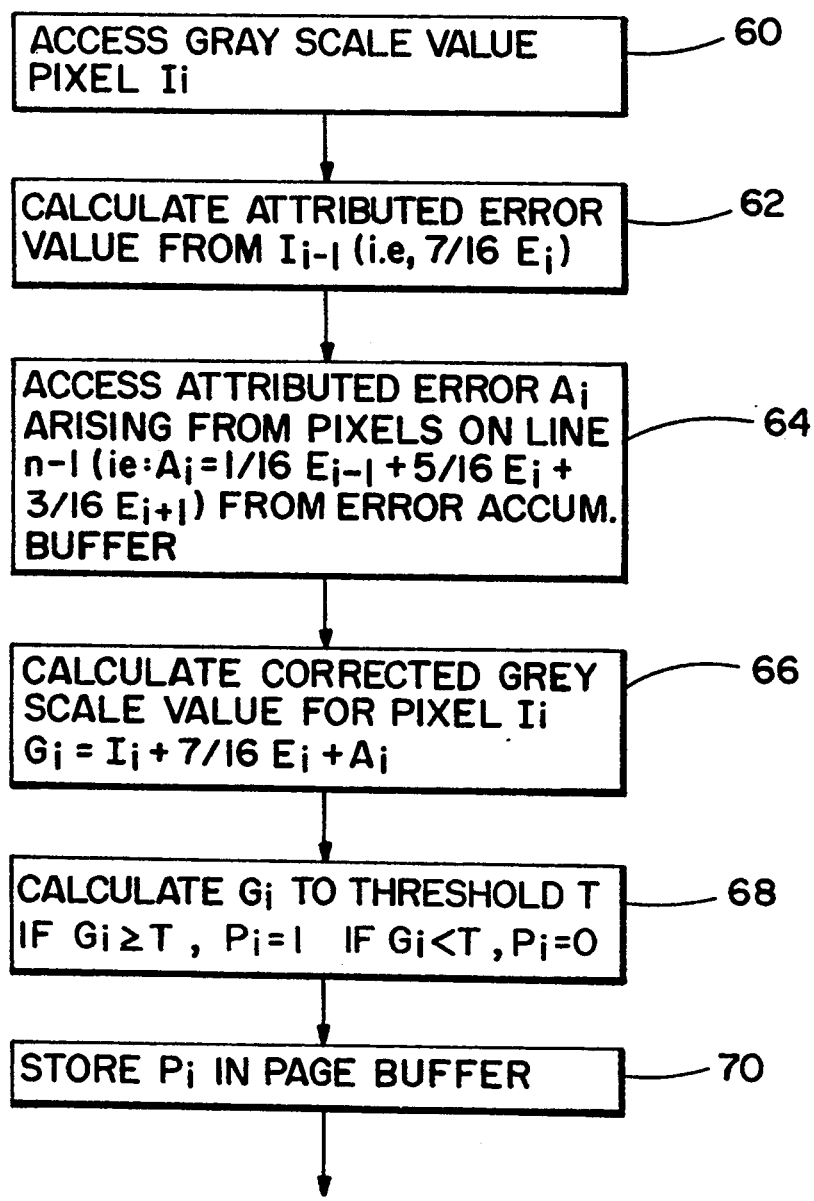

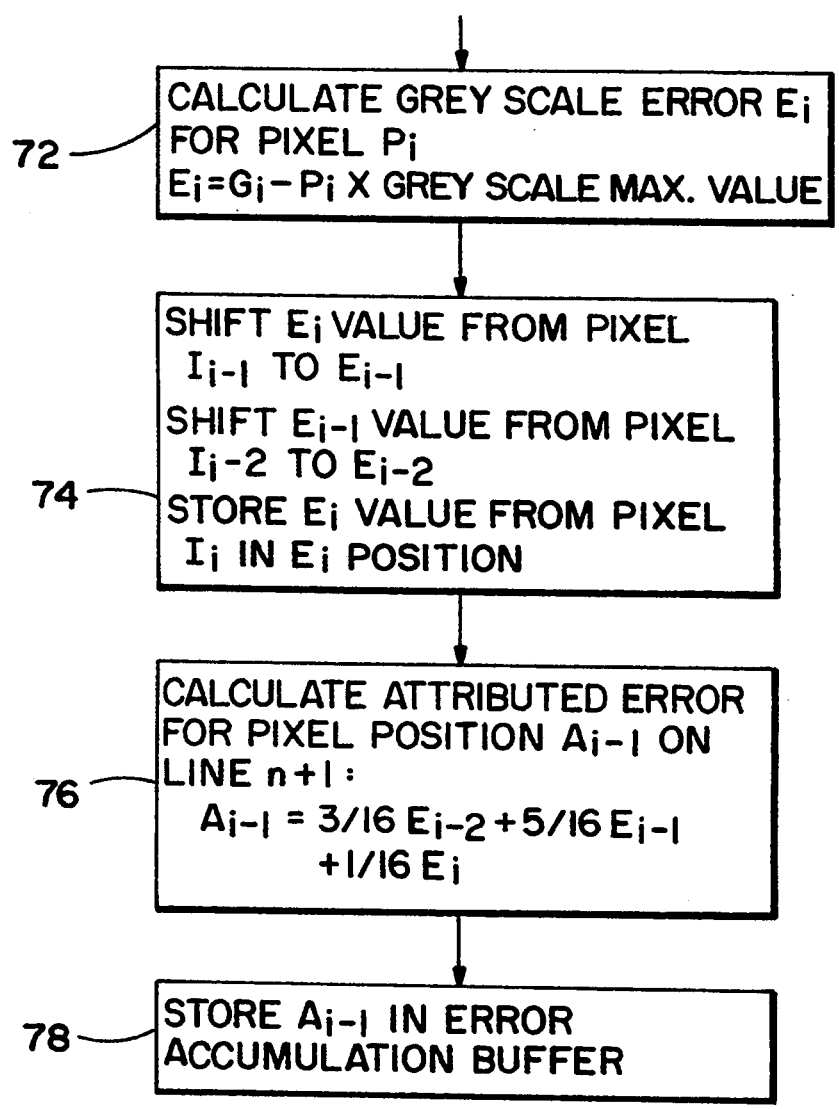

ERROR DIFFUSION PROCESSOR AND METHOD FOR CONVERTING A GREY SCALE PIXEL IMAGE TO A BINARY VALUE PIXEL IMAGE

FIELD OF THE INVENTION

This invention relates to systems for converting grey scale pixel images into binary value pixel images and, more particularly, to a system for diffusing pixel value errors that result during the conversion process to adjacent pixels so as to provide a diffused grey scale.

BACKGROUND OF THE INVENTION

Presently, raster scan printers are called upon to produce binary pixel half-tone images from full grey scale pixel images. In a grey scale image, each pixel element fed from a processor includes a multi-bit binary value that defines the pixel's grey scale value. An eight bit byte can define any of 0–255 grey scale values. In converting such a grey scale pixel image to a binary value pixel image, each pixel's grey scale value is compared to a threshold, and if the grey scale value equals or exceeds the threshold, it is assigned a first binary value (e.g. a "one"). If its value is less than the threshold, it is assigned a complementary binary value (e.g. a "zero"). Such conversion accomplishes the creation of a binary half tone image, but the quality of the image is less than satisfactory as it does not account for error values that occur during the conversion. An "error value" is the difference between the binary pixel value after conversion and the grey scale value of the pixel before conversion.

To improve the quality of binary images, Floyd et al. in "An Adaptive Algorithm Spatial Grey Scale" Proceedings of the Society for Information Display: Vol. 17, No. 75 (1976) pp. 36–37 suggested that error values be diffused to adjacent pixels so as to provide smoother half-tone transitions and a more pleasing picture. In FIGS. 1 and 2, the error diffusion algorithm described by Floyd et al. will be considered.

In FIG. 1, each pixel in grey scale image 10 has an assigned grey scale value. Exemplary values are indicated above each column of pixels and it is assumed that all pixels in each column have the same grey scale value. Accordingly, pixel 12 ($P_i$) has a grey scale value of 20 (assuming a grey scale range of 0–255). If it is further assumed that a threshold for conversion of grey scale values to binary values is midway between 0 and 255, i.e., 127, then pixel 12, upon comparison to the threshold, is converted to a zero binary value. However, this conversion creates a grey scale error value of 20 (when the binary pixel value is compared to the grey scale value of pixel 12 prior to conversion). Floyd et al. suggest an allocation of the pixel's error to immediately adjacent pixels.

An enlarged view of pixel $P_i$ and its adjacent pixels on scan lines n−1, n, and n+1 is shown in FIG. 2. The Floyd et al. error diffusion procedure considers only the pixel to the right of pixel 12 and immediately adjacent pixels 14, 16 and 18 on the next scan line. Floyd et al. consider that all pixels on scan line n−1 and those pixels to the left of $P_i$ have already been processed and can no longer be modified.

Floyd et al. allocate defined fractions of the pixel error from pixel 12 to adjacent pixels 14, 16, 18 and 20 as follows: 1/16, 5/16, 3/16 and 7/16, respectively. The allocation of the pixel error to neighboring pixels causes a cancellation of the error values and creates a total brightness of the pixel group which, when taken together, is close to the total desired brightness.

Prior art processors which implement the Floyd et al. error diffusion algorithm do so in a time consuming manner. Classically, each pixel to which an error value is to be attributed is accessed from memory; the error value attributable to that pixel calculated; the attributed error value added to the pixel value; and the sum returned to memory. When such a pixel is later reached for conversion to a binary value, identical computations are performed for each pixel that adjoins it, etc. Thus, for each pixel, an error diffusion calculation involves at least four memory accesses and four independent error value calculations. In a high speed printer, the available time for error value diffusion is constrained and, insufficient processor time is available to perform the prior art procedures for implementing the Floyd et al. error diffusion procedure.

Accordingly, it is an object of this invention to provide an improved implementation of the Floyd et al. error diffusion procedure.

It is another object of this invention to provide an implementation of the Floyd et al. error diffusion procedure which reduces required memory accesses.

SUMMARY OF THE INVENTION

A data processing system converts a raster image of grey scale value pixels into an image of binary value pixels and diffuses pixel value errors that result from the conversion. The data processing system initially converts a grey scale value pixel to a binary value pixel, determines an error value for the pixel by finding a difference between the pixel's binary value and its previous grey scale value; derives error diffusion values attributable to immediately adjacent pixels in a next line of the raster image and stores those attributable error diffusion values. Upon reaching one of the immediately adjacent grey scale value pixels in the next line, and during a conversion of that pixel from its grey scale value to a binary value, the stored error diffusion values are accessed and combined with the adjacent pixel's grey scale value.

DESCRIPTION OF THE DRAWINGS

FIGS. 4 and 5 illustrate a flow diagram of the procedure employed by the system of FIG. 3.

DETAILED DESCRIPTION OF THE INVENTION

Figure 3:
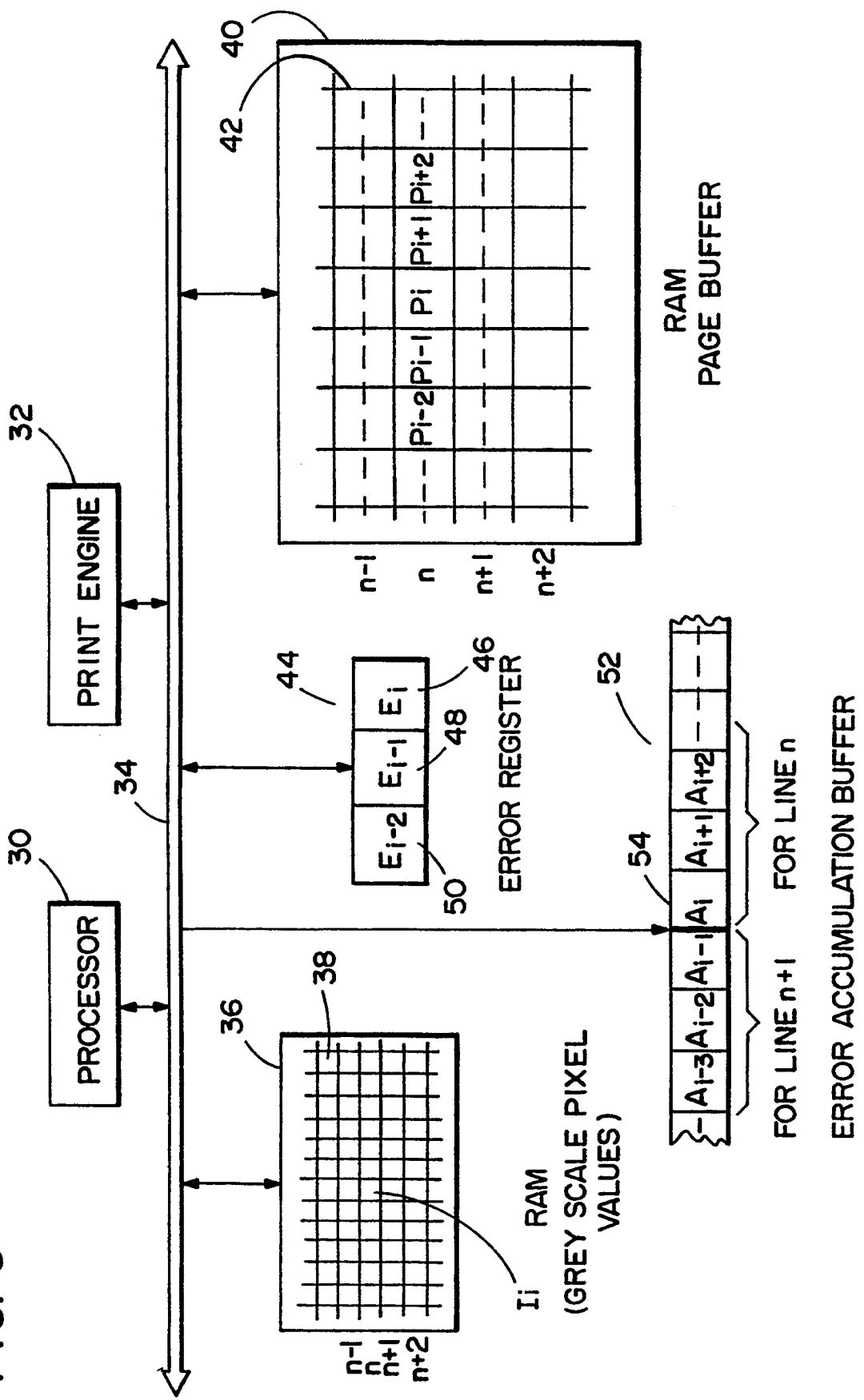
FIG. 3 shows a block diagram of a data processing system for performing pixel error diffusion in accordance with the invention.

Turning now to FIG. 3, a processor 30 controls the operation of a print engine 32 via bus 34. A random access memory (RAM) 36 is coupled to bus 34 and is an image buffer that stores bytes defining a grey scale value for each of pixels 38 stored therein. A further RAM page buffer 40 is coupled to bus 34 and contains binary values that define the state of each of pixels 42 stored therein. Each of pixels 42 has a binary value of either 0 or 1, with print engine 32 responding to a 0 by not printing a dot and responding to a 1 by printing a dot, at corresponding pixel locations.

The system of FIG. 3 includes a pair of additional memories which enable rapid accomplishment of the Floyd et al. error diffusion procedure. An error register 44 contains three grey scale pixel error values from the three pixels that have come just before a pixel under consideration. Thus, memory positions 46, 48 and 50 contain pixel error values for the first, second and third pixels, respectively, to the left of a pixel under consideration.

Also connected to bus 34 is a full scan line length error accumulation buffer 52 that contains accumulated pixel error values attributable to a currently considered scan line. Each memory position within error accumulation buffer 52 corresponds to a pixel column. The notation within each storage position in buffer 52 indicates a present pixel under consideration, its preceding pixels and its succeeding pixels. The memory positions in buffer 52 that are to the left of buffer position 54 are attributed error values that correspond to a next scan line rather than a current scan line. Those values are written over error accumulation values for the current scan line once they have been utilized for the current scan line.

Turning to FIGS. 4 and 5 in conjunction with FIG. 3, the procedure followed by the system of FIG. 3 is illustrated. Referring first to FIG. 3, assume that RAM 36 contains an image of grey scale pixels 38. Assume further that grey scale pixel $I_i$ on scan line n is chosen for conversion to a binary value. As will be hereinafter understood, error register 44 contains previously calculated error values for the three pixels to the left of grey scale value pixel $I_i$ on scan line n. Thus, the value stored in register position 46 ($E_i$) is the calculated error value for the pixel immediately to the left of grey scale pixel $I_i$, etc.

Turning to FIG. 4, processor 30 initially causes grey scale value $I_i$ to be accessed from RAM 36 (box 60). Before comparing the grey scale value of pixel $I_i$ to a threshold value, its grey scale value is modified in accordance with the teachings of Floyd et al. by attribution of fractional grey scale pixel error values from adjacent pixels. As previously indicated, position 46 in error register 44 contains the error value for pixel $I_{i-1}$ on scan line n. As can be seen from FIG. 2, the fractional attribution of error value to a next succeeding pixel (e.g. $I_i$) on scan line n is 7/16 times the error value of pixel $I_{i-1}$. Thus, as shown in box 62, the error value to be attributed from pixel $I_{i-1}$ is calculated by multiplying the value $E_i$ in error register 44 by 7/16.

Hereafter, while fractional values will be indicated as multipliers, the preferred method for carrying out the invention is to multiply all grey scale values by 16 and all error values by 16 so as to avoid having to perform fractional arithmetic. Such a multiplication is easily accomplished by a simple shift of the grey scale binary value four-bit positions to the left (or a direct entry of the grey scale value, four positions to the left).

Figure 1:
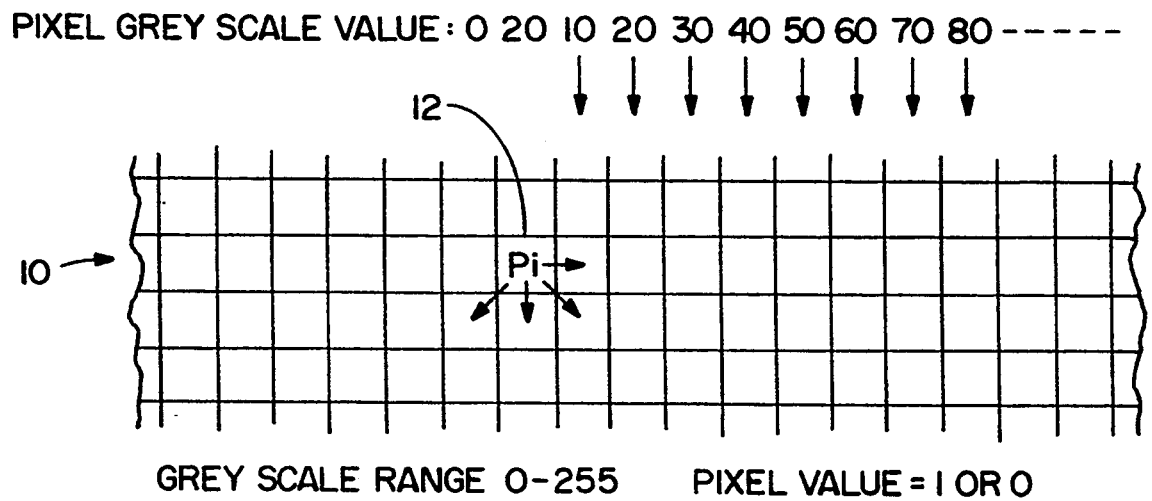
FIG. 1 is a schematic view of a pixel matrix, each pixel having an assigned grey scale value.
Figure 2:
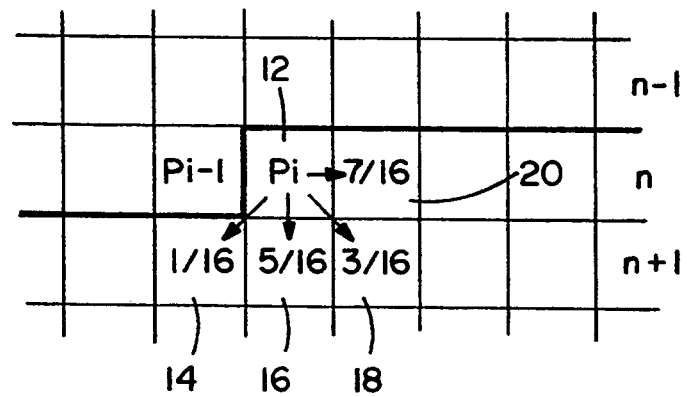
FIG. 2 is an expanded view of a pixel in FIG. 1, showing pixel error fractions that are attributed to immediately adjacent pixels.

As can be seen from FIG. 2, each pixel grey scale value on scan line n+1 will have attributed to it fractions of a pixel error values from pixels on scan line n. As an example, pixel 16 on scan line n+1 will have, as shown, 5/16 of the grey scale error value attributed from pixel $P_i$. Similarly, when pixel $P_{i-1}$ was considered, 3/16 of its grey scale error value was attributed to pixel 16. Likewise, when pixel 20 ($P_{i+1}$) is considered, 1/16 of its error value will be attributed to pixel 16.

Thus, as individual pixel error values on scan line n are derived, attributed error values are found and accumulated for each pixel on scan line n+1.

Once the end of scan line n is reached, all pixels on scan line n+1 have had attributed thereto (and have had accumulated) summations of pixel error values from immediately adjacent pixels on scan line n. Those values are stored in error accumulation buffer 52 in FIG. 3.

Returning to FIG. 4, when considering a pixel $I_i$ on scan line n, an attributed error value from the immediately preceding pixel $I_{i-1}$ is derived from pixel error $E_i$ by multiplying it by 7/16 (box 62). Then an attributed error $A_i$ which arose from pixels on scan line n−1, is accessed from error accumulation buffer 52 (box 64). As above indicated with respect to FIG. 2, that value is:

$$A_i = 1/16 \; (E_{i-1}) + 5/16 \; E_i + 3/16 \; (E_{i+1}).$$

The procedure then calculates a corrected grey scale value $G_i$ for pixel $I_i$ by adding attributed pixel error values from scan line n−1 and from preceding pixel ($I_{i-1}$) to the grey scale value of pixel $I_i$ (box 66). That calculation can be expressed as follows:

$$G_i = I_i + 7/16 \; E_i + A_i$$

The corrected grey scale value $G_i$ is then compared to a threshold value T (box 68). For a grey scale of 0–255, a threshold value of 127 is assumed (but it may be any other desired value). If corrected grey scale value $G_i$ is greater than or equal to the threshold value, the binary pixel value $P_i$ is set equal to the one logical level. If, however, the corrected grey scale value $G_i$ for pixel $I_i$ is less than the threshold value, then the value of pixel $P_i$ is set equal to the 0 logical level. As can now be seen, the binary value of pixel $P_i$ reflects not only the grey scale value of pixel $I_i$, but also attributed pixel error values from adjacent pixels. The binary for pixel $P_i$ is next stored in page buffer 40 (box 70).

The procedure now moves to update the error values in error register 44 in preparation for consideration of pixel $I_{i+1}$ and so as to enable an attributed error values for pixel positions on scan line n+1 to be calculated and stored. As shown in FIG. 5, the procedure commences by calculating the grey scale error $E_i$ for pixel $P_i$ as follows:

$$E_i = G_i - P_i \; x \; (grey \; scale \; maximum \; value)$$

$E_i$ is thus a value that is equal to the corrected grey scale value of pixel $I_i$ less the binary value of pixel $P_i$ (converted to a grey scale value) (box 72). If pixel $P_i$ has a value of One, and the grey scale maximum value is 255, then the grey scale error $E_i$ will be equal to the difference between 255 and the corrected grey scale value $G_i$. By contrast, if pixel value $P_i$ is set equal to 0, then the grey scale error $E_i$ is equal to the corrected grey scale value $G_i$. In either case, $E_i$ indicates the difference between the actual binary value of pixel $P_i$ and the grey scale value of pixel $I_i$ after it has been modified by attribution of error values from adjacent pixels.

Next, as shown in box 74, the contents of error register 44 are shifted one position to the left and the newly calculated value $E_i$ is inserted into position 46. Next, before moving onto pixel $I_{i+1}$, the attributed error for a pixel $I_{i-1}$ on scan line n+1 is calculated and stored in error accumulation buffer 52 (box 76). The attributed error value for pixel position $I_{i-1}$ on scan line n+1 is:

$$A_{i-1} = 3/16\ E_{i-2} + 5/16\ E_{i-1} + 1/16\ E_i.$$

The value $A_{i-1}$ is now stored (box 78) in error accumulation buffer 52 and, eventually becomes $A_i$ when scan line n+1 is accessed. As previously noted, only a single error accumulation line buffer 52 is required, as the accumulated error for a pixel already considered can be overwritten by a new accumulated error value for a pixel on scan line n+1.

In summary, the Floyd et al. error attribution procedure is now accomplished with one-half of the memory accesses as were required by the prior art process. As a result, error attribution is accomplished in a fraction of the time and the use of the procedure in high speed printers is enabled.

It should be understood that the foregoing description is only illustrative of the invention. Various alternatives and modifications can be devised by those skilled in the art without departing from the invention. For instance, while specific fractional attribution values have been specified, those values are for exemplary purposes and may be altered as desired. Accordingly, the present invention is intended to embrace all such alternatives, modifications and variances which fall within the scope of the appended claims.

I claim:

1. In a data processing system for converting a raster image of grey scale value pixels into an image of binary value pixels and for diffusing pixel error values that result from said conversion, the method comprising the steps of:
   converting, sequentially, grey scale value pixels to binary value pixels on scan lines of said raster image;
   for each said grey scale value pixel, determining a pixel error value that results from said converting step, said pixel error value being the difference between a grey scale equivalent to the binary value of a pixel and said pixel's grey scale value;
   attributing a portion of each said pixel error value from a pixel position on a first scan line to an immediately adjacent pixel position on a next scan line;
   accumulating and storing all pixel error value portions attributed to each adjacent pixel position on said next scan line so as to provide a summed, attributed error value for each said adjacent pixel position on said next scan line; and
   modifying a grey scale value of a pixel to be entered in said immediately adjacent pixel position on said next scan line in accordance with a summed, attributed error value for said immediately adjacent pixel position only when said immediately adjacent pixel position is reached, in sequence, for conversion from a grey scale value to a binary value.

2. The method as recited in claim 1, wherein said determining step includes a step of storing pixel error values for a plurality of said pixels, and said modifying step adds a portion of an immediately preceding pixel's error value to the pixel value to which said accumulated pixel error value is also added.

3. The method as recited in claim 2 wherein, subsequent to said modifying step, said modified pixel value is compared to a threshold grey scale value and is converted to a binary value in accordance with said comparison.

4. A data processing system for converting a raster image of grey scale value pixels into an image of binary value pixels, and diffusing pixel error values that result from the conversions, the system comprising:
   memory means for storing a raster image of grey scale pixel values of an image;
   page buffer means for storing binary value pixels of a raster scan image;
   error register means for storing pixel error values that result when a grey scale value pixel is converted to a binary value pixel;
   buffer means having storage positions allocated to pixel positions on a scan line, for storing an accumulation of error values from immediately adjacent pixels that are attributed to a said pixel position; and
   processor means for sequentially converting grey scale value pixels to binary value pixels and for determining a pixel error value for each said grey scale value pixel and storing a said pixel error value in said error register means, said processor means further attributing a portion of each said pixel error value on a current scan line to an immediately adjacent pixel on a next scan line and storing all said attributed portions in a pixel position in said error accumulation buffer means for use when a pixel in said pixel position in said next scan line is reached for conversion to a binary value.

5. The system as recited in claim 4 wherein said processor additionally adds an attributed error value portion from an immediately preceding pixel when said pixel is reached for conversion to a binary value.

6. The system as recited in claim 5 wherein subsequent to additions of attributed error value portions to a pixel value to be converted to a binary value, said processor means compares the pixel value being converted to a threshold value and accordingly assigns a binary value to said pixel value being converted, said binary value stored in said page buffer means, said processor means employing said binary value to update an error value in said error register means.

* * * * *